(12) United States Patent
Dworatzek et al.

(10) Patent No.: US 7,258,718 B2
(45) Date of Patent: Aug. 21, 2007

(54) FILTER ELEMENT, PARTICULARLY FOR CLEANING COMBUSTION AIR

(75) Inventors: Klemens Dworatzek, Edingen (DE); Bertram Uebelhoer, Waiblingen (DE); Ralf Ohm, Zaberfeld (DE)

(73) Assignee: Mann & Hummel GmbH, Ludwigsburg (DE)

( * ) Notice: Subject to any disclaimer, the term of this patent is extended or adjusted under 35 U.S.C. 154(b) by 369 days.

(21) Appl. No.: 10/891,454

(22) Filed: Jul. 15, 2004

(65) Prior Publication Data

US 2005/0044830 A1 Mar. 3, 2005

(30) Foreign Application Priority Data

Jul. 18, 2003 (DE) ................................. 103 32 988

(51) Int. Cl.
*B01D 46/00* (2006.01)
(52) U.S. Cl. ...................................................... 55/502
(58) Field of Classification Search .................. 55/502, 55/497, 498, 499, 501, 505, 507, 511, DIG. 30; 210/450
See application file for complete search history.

(56) References Cited

U.S. PATENT DOCUMENTS

| 3,397,518 | A | * | 8/1968 | Rogers | ........................ 55/502 |
|---|---|---|---|---|---|
| 4,473,471 | A | * | 9/1984 | Robichaud et al. | ......... 210/443 |
| 5,125,941 | A | * | 6/1992 | Ernst et al. | ................... 55/502 |
| 5,762,796 | A | * | 6/1998 | Zraik | ...................... 210/493.1 |
| 5,795,361 | A | * | 8/1998 | Lanier et al. | .................. 55/502 |
| 6,039,779 | A | * | 3/2000 | Butz et al. | ..................... 55/499 |
| 6,447,567 | B1 | * | 9/2002 | Ehrenberg | .................... 55/502 |
| 6,955,701 | B2 | * | 10/2005 | Schrage | ....................... 55/502 |
| 2003/0146149 | A1 | * | 8/2003 | Binder et al. | .......... 210/497.01 |
| 2003/0182909 | A1 | * | 10/2003 | Gieseke et al. | ............... 55/502 |
| 2004/0159236 | A1 | * | 8/2004 | Otsuka et al. | ................ 55/502 |

FOREIGN PATENT DOCUMENTS

DE 19944344 3/2000

* cited by examiner

*Primary Examiner*—Duane Smith
*Assistant Examiner*—Robert Clemente
(74) *Attorney, Agent, or Firm*—Crowell & Moring LLP

(57) ABSTRACT

A filter element, in particular for cleaning combustion air for internal combustion engines, arranged in a filter housing composed of a filter medium having at least one end face on which a resilient, synthetic resin sealing bead is arranged which contacts a sealing contour on the filter housing. An identifier element which is completely covered by the sealing bead is arranged in the filter element, for example, within an end disk thereof.

8 Claims, 2 Drawing Sheets

FILTER ELEMENT, PARTICULARLY FOR CLEANING COMBUSTION AIR

BACKGROUND OF THE INVENTION

The present invention relates to a filter element, particularly for cleaning combustion air, for use in a filter housing having a filter medium with at least one end face enclosed by a sealing bead of resilient synthetic resin material that contacts a sealing contour on the filter housing.

Published German patent application no. DE 199 44 344 discloses a filter element having the following features. An end disk made of an elastic sealing material is arranged on the respective face disks of the hollow cylindrical filter element. A connecting opening provided on the inside of at least one of the end disks communicates with a connection nipple situated inside the filter housing. Thus the side of the end disk which has a connecting opening must be pushed over the connection nipple to establish a tight connection. This leads to the object of creating a radial tension on the elastic connecting opening of the end disc sufficient to form a tight closure. This radial tension is achieved by the fact that a ring, preferably made of synthetic resin material, is situated in the elastic end disk which forms a connecting opening on the periphery at the outer end at a radial distance from the inside diameter This reduces the inside diameter of the end disk in the relaxed state to a smaller size than the outside diameter of the connection.

SUMMARY OF THE INVENTION

It is an object of the present invention to provide an improved filter element provided with an identifying element.

Another object of the invention is to provide a filter element which can be identified at any time without any externally perceptible indication.

A further object of the invention is to provide a filter element with an identifying element which remains secure despite the mechanical and thermal stresses that occur during handling and operation of the filter element.

Another object of the invention is to provide a filter element with an identifying element which can be manufactured economically.

These and other objects are achieved in accordance with the present invention by providing a filter element for use in a filter housing, the filter element comprising a filter medium having at least one end face surrounded by a resilient, synthetic resin bead that contacts a sealing contour on the filter housing when the filter element is inserted in the housing; the filter element further comprising an identifier element completely covered by the bead so that the identifier element is not externally visible.

The filter of the invention element for cleaning combustion air is comprised of a filter medium which is surrounded on at least one end face by a bead of resilient sealing material. The bead encloses the edge area of the filter medium and may form the end disk in the case of hollow cylindrical filter media and/or at the same time may establish a sealing bead for tight connection with the filter housing, whereby the corresponding sealing faces may be formed radially and/or axially. Suitable filter media include, for example, paper, partially or fully synthetic materials or natural fibers, in which case the filter media may be folded, coiled or layered. In the case of filter media folded in zig-zag pleats, the bead may be used for sealing the folds of the filter element and at the same time for compensating for the tolerance of the installed filter element due to its elasticity. Silicone rubber and polyurethane foam are examples of suitable materials for producing the sealing bead. An identifier element which is made of a material having a high resistance to mechanical and thermal loads during assembly and operation and is not visible from the outside is incorporated into the sealing bead.

The identifier element may be in the form of woven fiber mat layers of, for example, glass fibers, Kevlar or any materials having a high thermal and mechanical resistance. The identifier element may be designed to be round, rectangular, disk-shaped, strip-shaped, ring-shaped, cube-shaped or to have any conceivable geometry. Several similar or different identifier elements may also be positioned at different locations within the bead.

Due to the concealed arrangement of the identifier element, the advantageous embodiment offers a means of identifying the filter element and even securing it after extreme thermal or mechanical stresses. In particular, it is possible to differentiate low-quality replacement parts, so-called knock-offs or plagiarized products marketed by counterfeiters, from genuine replacement parts produced by the original manufacturer which are identified with the identifier element. This is especially important because low-quality highly flammable filter media used by counterfeiters in vehicle filters may lead to the risk of fire in the vehicle.

In one advantageous embodiment of this invention, the filter element is designed as a hollow cylinder having two axially opposed end faces, both of which correspond to a filter housing and at least one of which is provided with an opening. The annular surfaces of the two end faces of the filter medium are to be closed, preferably using a resilient synthetic resin material, which at the same time performs both sealing functions and tolerance equalizing functions. Paper or a nonwoven material folded in zigzag pleats as well as a coiled filter medium may be selected as the filter medium. The bead is preferably designed on the end face, which is open toward the hollow cylindrical space, so that it forms an annular sealing bead which continues the internal cross section of the hollow cylinder in the axial direction beyond the end face and thereby forms a sealing face with a pipe connection or an annular flat face of the filter housing. In a hollow cylindrical filter element, it is advantageously possible to provide the identifier element on one or both end faces and to use ring-shaped identifier elements for this purpose.

According to another advantageous embodiment of this invention, the filter medium is a flat filter medium, in particular a flat plate of filter medium pleated in zigzag folds, preferably made of paper or a nonwoven material. The lateral ends of the folds are usually sealed by gluing, and on one end face or on the circumference, the filter medium must be enclosed by a bead, i.e., a sealing bead, which corresponds to a sealing contour of the filter housing. Therefore, a resilient material such as polyurethane foam is advantageously used. According to the circumferential geometry of the bead, which is usually rectangular in shape but may also be round, oval or polygonal, the design of an identifier element also makes it possible for the peripheral geometry to be designed in one piece or in multiple pieces accordingly. For example, the identifier element may be applied to the edge area of the filter medium before the operation of spraying on the polyurethane foam, so that after the polyurethane foam has been sprayed on, the identifier element is enclosed and is not visible from the outside. To achieve reliable positioning of the identifier element, it may be designed with an L-shaped cross section, enclosing the filter medium, with one leg of the L shape protruding beyond the filter medium, thereby resulting in a form-fitting positioning of the identifier element. The identifier elements may also have all the known cross sections and shapes.

The identifier element can be integrated advantageously into a flat filter element and thus permits a simple, reliable and economical means of identification of the filter element.

According to another advantageous embodiment of this invention, the filter element has a supporting body which stabilizes the entire filter element, in particular in the case of round filter media. The supporting body preferably extends over the entire axial length of the filter medium and has an open flow cross section on at least one end face. The lateral surface of the supporting body is preferably designed in the form of a grid, and one end face may be closed completely or over only a portion of its area. The tight connection between the supporting body and the filter medium is preferably formed by the resilient bead. To permit good adhesion of the bead to the end face, a sealed end face may be designed in the form of a grid over a ring-shaped partial area or may have ribs, for example. A supporting body preferably in the form of a cassette is provided on a flat filter cartridge, enclosing the filter element on the lateral surfaces and connected in a sealed manner to the filter medium by the resilient bead. The supporting body is preferably made of a polymer, e.g., polypropylene or polyamide and results in an advantageous stabilization of the filter element.

Another advantageous embodiment of this invention is obtained by fixing the identifier element by and/or on the supporting body. The materials of the supporting body, which are stable in comparison with polyurethane foam, make it possible to provide contours, e.g., shoulders, grooves, holes or ribs which are designed to correspond to the contour of an identifier element. In the case of hollow cylindrical filter elements, the end face need not be provided with a sealing contour on both sides, but instead may be sealed on an end face by an integrally molded flat disk over a partial area or completely. With this embodiment there is the possibility of integrally molding the receptacle for a radially elastic metal ring by a radial shoulder on the flat disk. The radial elasticity may be achieved, for example, due to the geometry, the choice of materials or by a slot in the ring. This metallic ring which has a smaller diameter in the relaxed state than the integrally molded receptacle contour may be secured on the contour by its own internal tension and is then covered by applying the resilient sealing material and is finally secured on the carrier body. The applied resilient sealing material thus encloses the carrier body, covers the identifier element and encloses the filter medium up to its outside edge.

This permits an advantageous means of attaching the identifier element which will remain secure through the process and thus improves the profitability of the manufacturing process.

In an advantageous embodiment of the inventive concept, the identifier element is made of a metallic material. Elastic identifier elements such as clasps, clips or springs are suitable for easy attachment with corresponding contours of the supporting body or the filter medium. Metallic identifier elements may also contribute to the required mechanical reinforcement of the element. If the metallic identifier element is adapted to the circumferential shape of the sealing bead, then the sealing contour of the end disk is also mechanically stabilized and ensures a greater imperviousness.

Metallic materials have advantageous high thermal and mechanical properties and are inexpensive and simple to work so that they are an economically advantageous material as a resistance element. Other advantages of the metallic identifier element are derived from the quantity of mass produced metal articles available which are available inexpensively as such in many forms.

According to another advantageous embodiment of this invention, the manufacturer's identifying marks and codes are applied to the identifier element, these marks being embossed, imprinted, lasered, welded, baked or applied by any other method known from the state of the art. In addition to the pure form of the identifier element, additional information may also be applied to advantage in this way.

In addition, there is the advantageous possibility of storing cryptologically encoded data, such as the manufacturing date, the manufacturer's number, the order number or lot number on the identifier element. This information may also be encoded or applied to the identifier element as a barcode. This makes it possible at any time to ascertain the original data on the filter element. If the identifier element is introduced into the filter element without labeling, it is also possible for its mere shape or presence to provide an indication of the manufacturer.

Use of a radially elastic piston ring as a metal ring is advantageously suggested. The piston ring is suitable in particular due to its narrow geometry and its light weight. In addition, because of its elasticity it may be clamped or stretched onto a radial shoulder and is thus pre-positioned before applying a sealing bead or a corresponding contour of the supporting body, e.g., a radial shoulder on the end face. Because of the high demand for piston rings in engine production, they are produced and made available advantageously.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
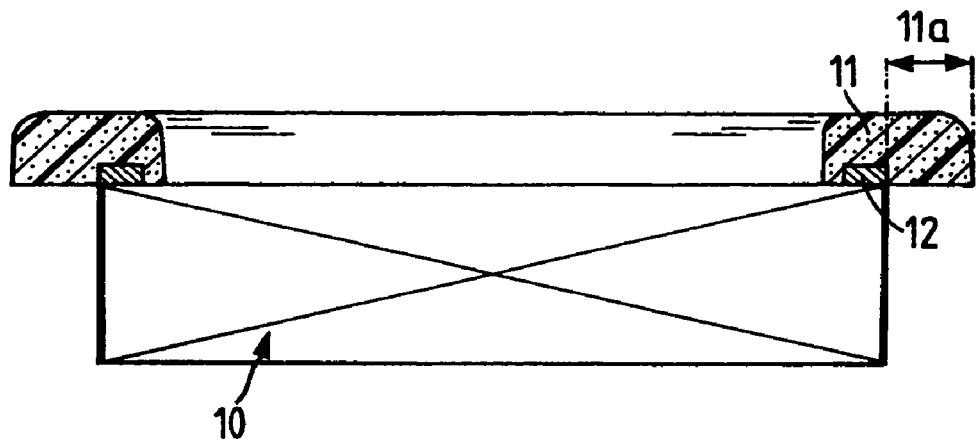
FIG. 1 is a sectional view of a flat filter element according to the invention.

FIG. 1 shows a filter element which comprises a filter medium 10, a sealing bead 11 enclosing the filter medium 10 on the end face, and a metal disk 12 embedded in the sealing bead 11. The metal disk 12 serves as an identifier element for identification of the filter element. The sealing bead 11 contacts a seal contour on a filter housing (not shown) when the filter element is inserted in the housing. The metal disk 12 is adjacent to the edge of the filter medium 10 and is completely covered by the sealing bead 11 so that it is not externally visible. The partial area 11a of the sealing bead 11 which projects laterally beyond the filter medium 10 serves as a clamping surface for sealing the filter element relative to the filter housing.

Figure 2:
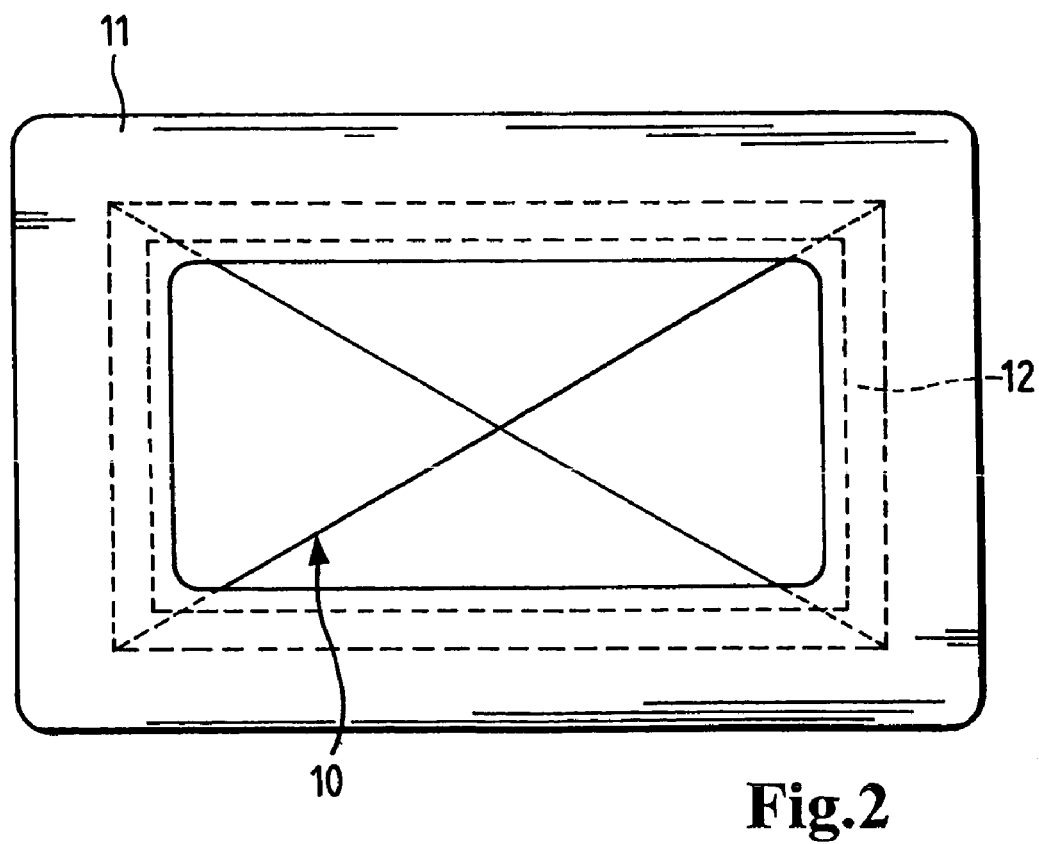
FIG. 2 is a top plan view of the flat filter element of FIG. 1.

FIG. 2 shows the sealing bead 11 which encloses the filter element on the longitudinal sides. Parts corresponding to those in shown in FIG. 1 are identified by the same reference numerals. The filter medium 10 is a medium folded in a zigzag pattern or pleated and which is adhesively bonded along its side surfaces in a sealing manner. The metal disk 12 is shown by broken lines and is embedded in the circumferential sealing bead.

Figure 3:
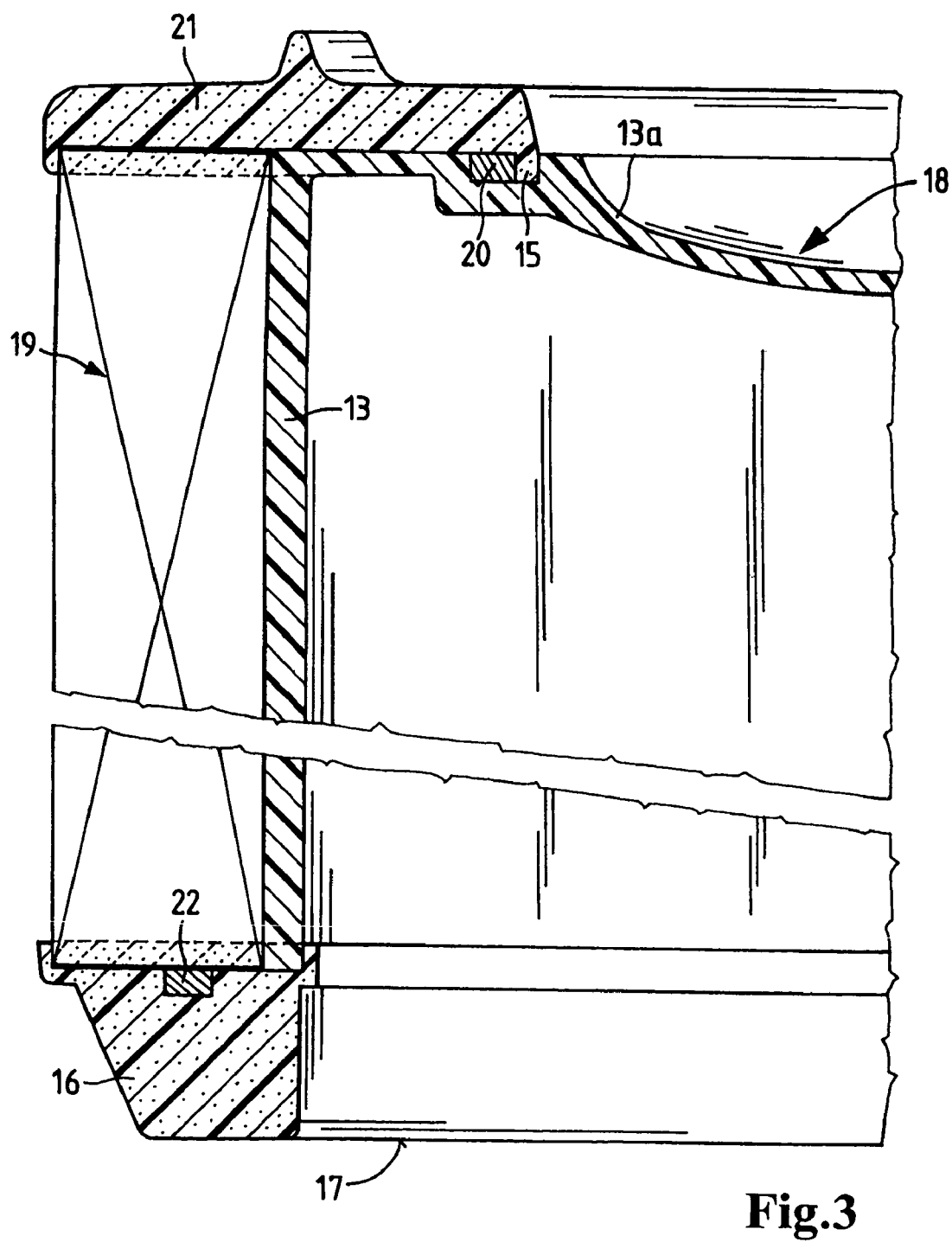
FIG. 3 is a sectional partial view of a cylindrical filter element according to the invention.

FIG. 3 is a sectional, partial view of a round filter element. The round filter element comprises a carrier body 13, which is encircled around its circumference by a hollow cylindrical round filter medium 19. On the end face The axial end face 17 of the support body 13 is open at the bottom, and the axial end face 18 at the top is closed over a partial area by a flat disk 13a. The circular flat disk 13a which is produced in one piece with the hollow cylindrical carrying body 13 is connected to the hollow cylindrical carrier body 13 by webs. An annular ring groove 15 is provided on the exterior of the flat disk 13a and serves to accommodate the identifier element, which in this case is configured as a metal ring 20. The axial end 18 of the filter element which is closed is covered from the interior part of the radial ring groove 15 to the exterior part of the filter medium 19 by a circular sealing bead 21. Thus the metal ring 20 is also secured to the support body 13 by the sealing bead 21. The axial end 17 of the filter element which is shown as being open at the bottom is annularly enclosed on the end face from the inside of the support body 13 to the outside of the filter medium 19 by an open sealing bead 16. This second sealing bead 16 contacts a sealing contour of a filter housing (not shown) when the filter element is inserted in the housing. The identifier element 22 which is present in the open sealing bead 16 is covered only by the resilient material of the open sealing bead 16 independently of the support body 13 and illustrates an alternative arrangement of the identifier element.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for use in a filter housing, said filter element comprising a filter medium having at least one end face surrounded by a resilient, synthetic resin bead that contacts a sealing contour on the filter housing when the filter element is inserted in the housing; said filter element further comprising an identifier element completely covered by the bead so that the identifier element is not externally visible; wherein the identifier element is a radially elastic, split circular ring formed of a metallic material.

2. A filter element according to claim 1, wherein said filter element is an air filter element for cleaning combustion air for an internal combustion engine.

3. A filter element according to claim 1, wherein the filter medium has a hollow cylindrical configuration.

4. A filter element according to claim 1, wherein the filter medium has a flat configuration.

5. A filter element according to claim 1, wherein said filter element further comprises a supporting body for the filter medium.

6. A filter element according to claim 5, wherein the identifier element is attached to the supporting body.

7. A filter element according to claim 1, wherein the filter element is identifiable by characterizing marks of the manufacturer provided on the identifier element.

8. A filter element according to claim 1, wherein the identifier element carries encrypted data.

\* \* \* \* \*